US006992702B1

(12) United States Patent
Foote et al.

(10) Patent No.: US 6,992,702 B1
(45) Date of Patent: Jan. 31, 2006

(54) SYSTEM FOR CONTROLLING VIDEO AND MOTION PICTURE CAMERAS

(75) Inventors: Jonathan Foote, Menlo Park, CA (US); Les Nelson, Santa Clara, CA (US); John J. Doherty, San Francisco, CA (US)

(73) Assignee: Fuji Xerox Co., Ltd, Tokyo (JP)

( * ) Notice: Subject to any disclaimer, the term of this patent is extended or adjusted under 35 U.S.C. 154(b) by 0 days.

(21) Appl. No.: 09/391,141

(22) Filed: Sep. 7, 1999

(51) Int. Cl.
*H04N 5/232* (2006.01)

(52) U.S. Cl. ............................... 348/211.8; 348/240.99

(58) Field of Classification Search ........... 348/240.99, 348/240.2, 211.8, 207.1, 207.11, 169, 170, 348/171, 172, 62, 63
See application file for complete search history.

(56) References Cited

U.S. PATENT DOCUMENTS

| | | | | |
|---|---|---|---|---|
| 4,566,036 | A * | 1/1986 | Kadosawa | 348/211.6 |
| 5,396,287 | A * | 3/1995 | Cho | 348/211.8 |
| 5,434,617 | A * | 7/1995 | Bianchi | 348/169 |
| 5,504,520 | A * | 4/1996 | Yamamoto | 348/154 |
| 5,523,783 | A * | 6/1996 | Cho | 348/157 |
| 5,528,289 | A | 6/1996 | Cortjens et al. | 348/211 |
| 5,748,228 | A * | 5/1998 | Kobayashi et al. | 348/63 |
| 5,864,363 | A * | 1/1999 | Giefing et al. | 348/169 |
| 6,067,112 | A * | 5/2000 | Wellner et al. | 348/63 |
| 6,115,482 | A * | 9/2000 | Sears et al. | 348/62 |
| 6,452,628 | B2 * | 9/2002 | Kato et al. | 348/333.12 |
| 6,476,868 | B1 * | 11/2002 | Kaji et al. | 348/333.12 |
| 6,624,846 | B1 * | 9/2003 | Lassiter | 348/211.8 |
| 2002/0054216 | A1 * | 5/2002 | Kawashima | 348/211 |

FOREIGN PATENT DOCUMENTS

| | | | |
|---|---|---|---|
| EP | 0622722 | A2 * | 4/1994 |
| EP | 0838751 | A2 * | 4/1998 |

OTHER PUBLICATIONS

Fitzmaurice, G.W., Ishii, H., and Buxton, W., Bricks: Laying the Foundations for Graspable User Interfaces, Proceedings of CH '95, pp. 442-449.*
Fishkin, K.P., Moran, T.P., and Harrison, B.L., Embodied User Interfaces: Towards Invisible User Interfaces, Proceedings of EHCI '98.
Fitzmaurice, G.W., Ishii, H., and Buxton, W., Bricks: Laying the Foundations for Graspable User Interfaces, Proceedings of CHI '95, pp. 442-449.
Geisler, W.S. and Perry, J.S. (1998) A real-time foveated multi-resolution system for low-bandwidth, video communication. In B. Rogowitz and T. Pappas (Eds.), Human Vision and Electronic Imaging, SPIE Proceedings 3299, 294-305.

(Continued)

*Primary Examiner*—Thai Tran
*Assistant Examiner*—Jason Whipkey
(74) *Attorney, Agent, or Firm*—Fliesler Meyer LLP

(57) ABSTRACT

Inputs drawn on a control surface or inputs retrieved based on tokens or other objects placed on a control surface are identified and a view of a camera, or a virtual view of a camera or camera array is directed toward a corresponding location in a scene based on the inputs. A panoramic or wide angle view of the scene is displayed on the control surface as a reference for user placement of tokens, drawings, or icons. Camera icons may also be displayed for directing views of specific cameras to specific views identified by any of drag and drop icons, tokens, or other inputs drawn on the control surface. Clipping commands, are sent to a display device along with the wide angle view which is then clipped to a view corresponding to the input and displayed on a display device, broadcasting mechanism, or provided to a recording device.

14 Claims, 14 Drawing Sheets

OTHER PUBLICATIONS

Gorbet, M., Orth, M., and Ishii, H., Triangles: Tangible Interface for Manipulation and Exploration of Digital Information Topography, in *Proceedings of Conference on Human Factors in Computing Systems* (CHI '98), (Los Angeles, Apr. 1998), ACM Press, pp. 49-56.

Ishii, H. and Ullmer, B. Tangible Bits: Towards Seamless Interfaces between People, Bits, and Atoms. *Proceedings of CHI '97*, pp. 234-241.

Kortum, P.T. and Geisler, W.S. (1996) Implementation of a foveated image-coding system for bandwidth reduction of video images. In B. Rogowitz and J. Allebach (Eds.) Human Vision and Electronic Imaging. SPIE Proceedings, 2657, 350-360.

Lueck, A., Martin, C., and Yoffe, B. Who's Myopic Now, Web page Computer Science 483, Texas A&M University, Spring 1998. www.cs.tamu.edu/course-info/cpsc-483/spring98/rabi/98a/g4/final_report.html.

Rekimoto, J. and Nagao, K., The world through the computer: computer-augmented interaction with real world environments, Proceedings of Eighth Annual Symposium on User Interface Software and Technology, (UIST95), 1995.

Underkoffler, J. and Ishii, H., Illuminating Light: An Optical Design Tool with a Luminous-Tangible Interface, in *Proceedings of Conference on Human Factors in Computing Systems* (CHI '98), Los Angeles, Apr. 1998), ACM Press, pp. 542-549.

L.C. De Silva, K. Aizawa and M. Hatori, "Use of Steerable Viewing Windows (SVW) to Improve the Visual Sensation in Face To Face Teleconferencing," in *Proc. ICASSP-94*, vol. 5, pp. 421-424, May 1994.

Wellner, P., "Digital Desk", Communications of the ACM, vol. 36, No. 7, Jul. 1993.

Swaminathan, R. and Nayar, S.K., Polycameras: Camera Clusters for Wide Angle Imaging, CUCS-013-99, Department of Computer Science, Columbia University, New York, New York 10027, srahul@cs.columbia.edu; nayar@cs.columbia.edu.

Sony EVI-D30 PTZ Camera w/Advanced Motion Tracking, http://picturephone.com/fp_sony3.htm.

Xerox touts DataGlyphs for paper data, Seybold Report on Desktop Publishing, vol. 9, No. 5, www.seyboldseminars.com/seybold_report/reports/D0905001.HTM.

3Space®Products, Polhemus, First in the third dimension, www.polhemus.com/welcome.htm.

Intuos, the intelligent graphics tablet system, Wacom, www.wacom.com/productinfo/.

Graphire, Intous USB, Wacom, www.wacom.com/index2.html.

DeepSea Power & Light, Pan/Tilt/Zoom 2001, www.deepseacom/ptz2001.html.

* cited by examiner

SYSTEM FOR CONTROLLING VIDEO AND MOTION PICTURE CAMERAS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates to a method and apparatus for control of one or more cameras, including motion picture cameras. The invention is also related to the control of a video camera array. The invention is more particularly related to controlling parameters of a shot of a still or video camera, particularly a pan angle and zoom of the camera being controlled. The invention is also related to interfaces for implementing control of the above and other camera parameters, including pen-based, illumination, and gesture based control interfaces.

2. Discussion of Background

Video cameras with controllable pan/zoom are commercially available. For example, SONY EVI-D30 has a range of zoom, tilt and pan that is controllable. Deep Sea Power & Light also produces a camera (the Pan/Tilt/Zoom 2001) having controllable pan tilt and zoom (specifically designed for underwater operation). However, such systems are constrained by the limitations of the mechanical systems that orient them.

Current interfaces to movable and cameras are not particularly intuitive, and typically consist of contact switches that move the camera up/down, left/right, and control a degree of zooming. Often, users must "pre-program various functions". For example, the SONY EVI-D30 requires a user to "pre-define" a subject for tracking, or alternatively to control the camera via an RS-232 interface.

Typically, motion of a movable camera is at one slow speed, to avoid overshoot, even if the control motors are capable of variable speeds. Even professional systems have only a joystick, which limits the interface from instantaneously panning to a new destination even if the camera control hardware supports it. For example, the DEEPSEA Power & Light Pan/Tilt/Zoom 2001 requires switching of control lines to either 12VDC or 12Vret for camera control, and has a joystick control option.

A particular advantage of virtual cameras is that they can be panned/zoomed virtually instantaneously, with none of the speed limitations due to moving a physical camera and/or lens. For example, Foote et al., Ser. No. 09/370,406, filed Aug. 9, 1999, incorporated herein by reference, in its entirety, discloses several embodiments of virtual cameras constructed from both fixed and movable cameras and camera arrays.

SUMMARY OF THE INVENTION

The present inventors have realized that automatic control of cameras, including camera arrays, can have many large benefits. For example if the target destination is known in advance, then the camera speed can be smoothly increased and decreased thus allowing for both a smoother and more rapid camera pan or zoom compared with a conventional camera. More importantly, appropriate interfaces can reduce a cognitive load of controlling cameras, making it easy for even inexperienced users to produce quality video.

The present invention includes a direct manipulation graphical user interface. A pen or other pointing device (e.g. a mouse, trackball, etc.) provides an interface for camera control or video production. A representation of the scene is used as an analog (overview) of the area to be captured on video. Icons graphically indicate camera location(s) or other parameters. Pen gestures indicate which areas of the scene are to be viewed with which video cameras, and are translated into commands that control the cameras.

The scene representation can be a real image, a moving image such as a video panorama, or a pictorial, graphic, or iconic representation of the scene. A gesture recognition device may also be utilized to capture gestures which are then interpreted and used to control camera pan, tilt, zoom as well as other attributes of the camera(s) (e.g., focus or color balance).

The present invention includes physical direct manipulation using tangible control objects. Physical "window frame" objects may be placed onto a surface that senses the location and kind of object being used. The frames are rectangular objects of the correct sizes and aspect ratios for indicating the desired view and zoom.

The present invention includes an apparatus and method for camera target illumination or virtual illumination. A handheld device is used to indicate where the camera view should be looking, by pointing the device at the desired area. The targeting device either illuminates the desired area with a detectable signal (e.g., IR) or the targeting device 'virtually illuminates' the area of interest, identifying its location from the position and orientation of the device pointed towards it.

One goal of the present invention is to simplify the camera controls necessary for 'routine' camera use in such applications as video conferencing, meeting capture, motion picture productions, or other general video or photographic production scenarios. Camera controls of the present invention involve a 'set-it, forget-it' action (e.g., gesture, manually nudging a frame token, or pointing an illuminator) from any user in the meeting space. In this way, a person present in a meeting will be not be continuously absorbed by the camera control, and, hence, will have a better chance in being able to participate in the discussion.

The present invention is embodied as method of presenting a user interface for control of at least one camera, comprising the steps of, displaying a wide angle view of scene, displaying a drag and drop icon associated with a camera, and directing said camera toward a location in said scene corresponding to a position on said wide angle view that said icon is dragged and dropped.

The present invention also includes a method of presenting a user interface for control of at least one camera, comprising the steps of, displaying a wide angle view of a scene on a pen based device, recognizing an input drawn on said pen based device, directing a camera toward a location in said scene corresponding to a position on said wide angle view that said input is drawn, and displaying a view associated with the input drawn. The pen based devices can be a tablet (hand-held or notebook style display with a pen input mechanism), or a full desktop or other computing and display mechanism with a pen input mechanism.

The present invention may be embodied in a device for directing a camera, comprising, a control display panel, having, a detection mechanism configured to detect an object placed on said control display panel, and a camera control device configured to direct at least one camera toward a scene at an angle corresponding to a location said object was placed on said control display panel.

Each method and embodiment of the present invention provides a new way to control cameras associated with video and/or still photographs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
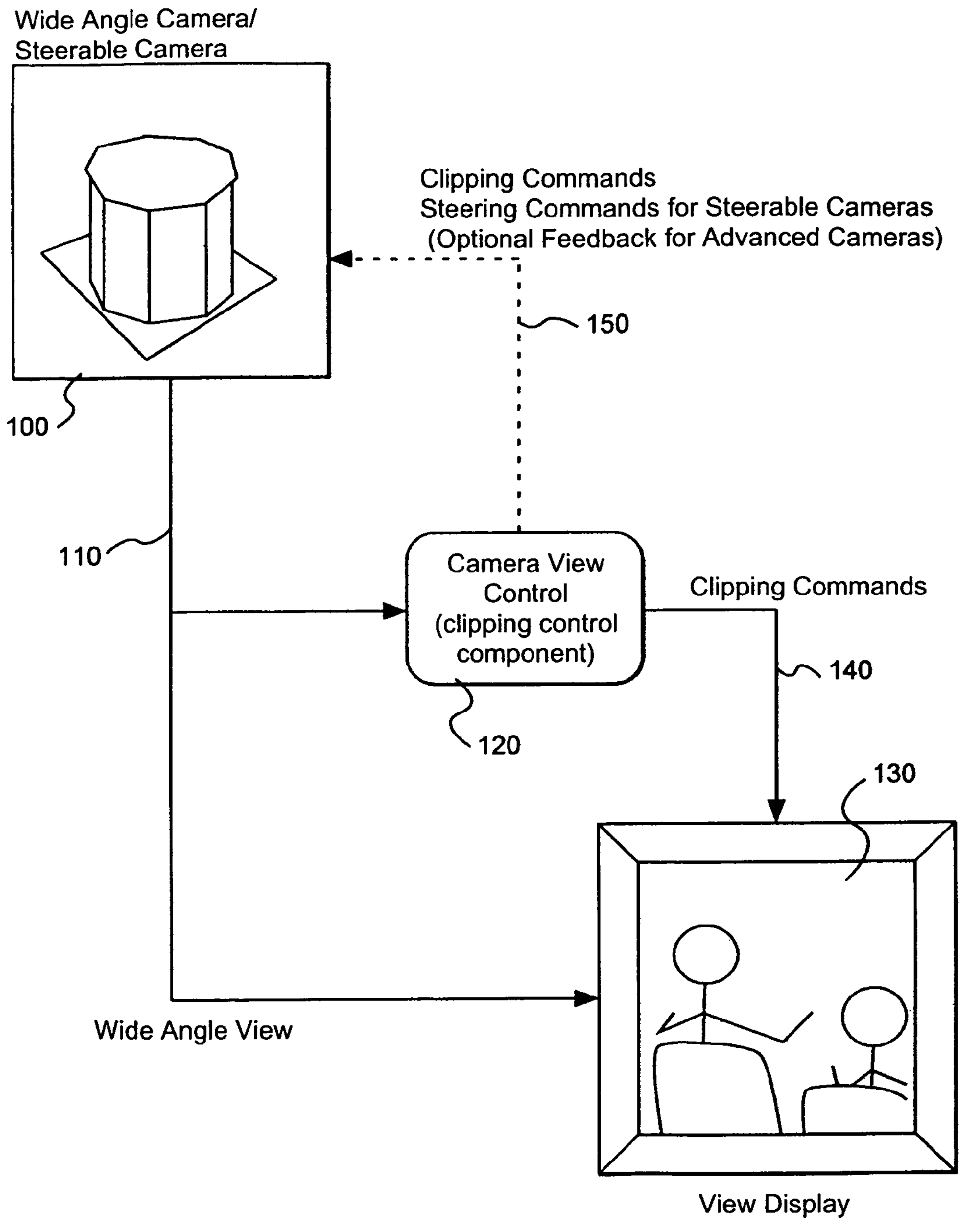
FIG. 1 is a flow diagram of image and control data according to one embodiment of the present invention.

Referring now to the drawings, wherein like reference numerals designate identical or corresponding parts, and more particularly to FIG. 1 thereof, there is illustrated a flow of image and control data through a system that is shared by several embodiments of the present invention. The system includes a camera 100. The camera 100 is illustrated as a camera array, and may also be embodied as any camera or image capture device, such as a simple digital or analog camera, a camera array, wide angle camera, and a steerable camera, for example.

The camera 100 provides a wide-angle camera view of a scene to support an electronic clipping process. A camera data stream 110 is split and directed simultaneously to a clipping control component 120 (also referred to as the camera view control 120) and a display view 130 (e.g., videoconference image, meeting capture recording, display device, etc).

Figure 2:
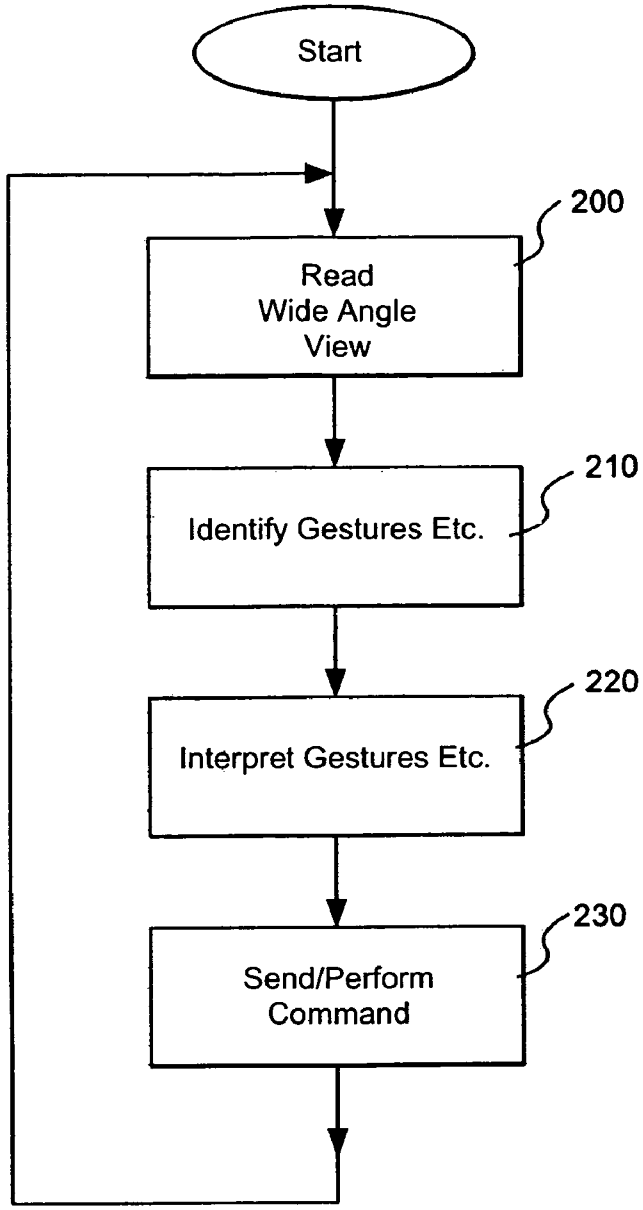
FIG. 2 is a flow chart illustrating steps for identifying and performing camera commands and operations.

In one embodiment, simple user actions are captured by the camera view control 120 and used to determine a location of the user's area of interest. Processes performed by the camera view control 120 are illustrated in the flow diagram of FIG. 2. A wide angle view from camera 100 is retrieved at step 200.

At step 210, the wide angle view is scanned to identify gestures of individuals captured in the wide angle view. Alternatively, camera view control 120 scans the wide angle view for illuminations (from an illumination device as described below) or receives commands from an input mechanism or other device. In yet another alternative, user actions associated with the camera view control 120 are recognized (a tapping or side to side motion of a token (see FIG. 5A), indicating turn the view on or off, for example).

In the case of gestures, the wide angle image is scanned for gestures (e.g., pointing (laser devices, for example), or other framing motions made by participants captures in the wide angle view) indicating an area of interest or other specific camera command. In the case of illuminations, the illuminations are recognized via any of line tracing, line recognition or other image processing procedures performed on the wide angle view. In the case of user actions, a code associated with the action or a program flow identifies the action.

At step 220, the gestures, illuminations, and/or user actions are interpreted to identify an action or a command to be implemented. For example, the camera control view may identify an "arms crossed" command from an individual in the wide angle view indicating the camera is to be turned off. At step 230, the identified action or command is performed or sent to a device to be performed (in the above example, the camera is turned off, or a command is sent to the camera to turn it off).

A user action for setting an area of interest could be either a gesture (e.g., pointing) or other mechanism (e.g., illumination mechanism, or drag and drop icon) for specifying a location of an area of interest. The position of the area of interest is utilized by the camera view control 120 to determine a region to be clipped (disregarded) in the display view, in order to leave a frame in the display view encompassing the area of interest.

Clipping commands 140 are sent to the display processor in order to perform the clipping operation of the wide-angle view needed to produce the isolated or display view 130. A display processor sizes the image to the aspect ratio required of a display device that displays the display view 130 (zooming the clipped region as needed, maintaining a fixed aspect ratio).

Optionally, at least some of the clipping commands 140 may be formatted as camera control commands 150 and fed back to the camera 100. The camera control commands 150 include any of steering commands (e.g., pan or zoom commands), clipping commands, and advanced processing commands (e.g., image processing of areas of interest). Alternatively, instead of clipping a wide-angle view, a steerable camera can be directed to the appropriate pan/zoom coordinates.

Figure 3:
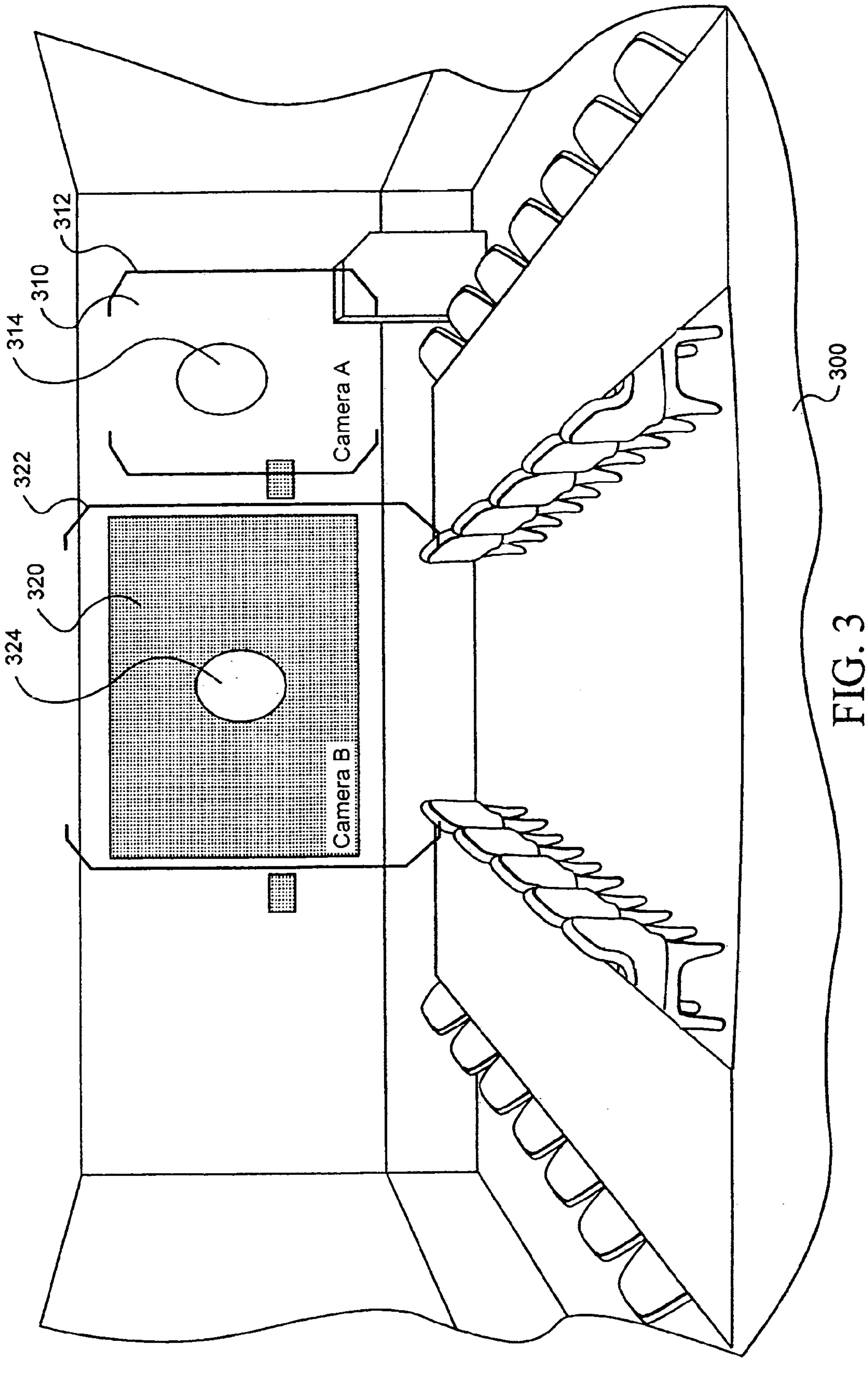
FIG. 3 is an example of an icon based user interface for directing camera views.

FIG. 3 shows an example of one embodiment of a two-camera control interface, and a pen or pointer based graphical user interface, using icons, which can be extended to any of one camera, an arbitrary number of cameras, or any number of virtual views from either of a single camera, plural cameras, or a camera array. Each field of view of a camera A and a camera B is shown iconically, via control icons 310 and 320 respectively, on a background image 300 of a conference room scene.

The cameras are controlled by interacting with its respective control icon. Each control icon includes handles (e.g., camera A control icon 310 including outer handle 312 and center handle 314, and camera B control icon 320 including outer handle 322 and center handle.) Moving the center handle of an icon moves the corresponding camera's view. Moving an outer icon handle changes the cameras zoom ratio; moving the outer handles closer to the center zooms in while the camera's field of view can be expanded by enlarging an area delineated by the handles. Other handles or icons (a sliding control bar, for example) can apply or cue different effects (e.g., a sliding control bar for adjusting brightness or contrast). Thumbnail images indicating the actual camera view can be incorporated in the control icon.

The background image 300 (a wide angle or panoramic view) can reflect the actual scene being shot or any graphic representation, including iconic or schematic ones such as floor plans or artists' renderings. Multiple places, scenes, or views can be used; for example two room scenes can be placed next to each other regardless of the actual room locations. In one embodiment, a "background" panorama of the scene is composed by excluding occluding objects using a fixed wide-angle camera. The objects may be excluded by any method, including median-filtering each pixel value over a predetermined time, so that non-background (occluding) objects are ignored. If an object is in place longer than the predetermined time extent, it becomes part of the background. Alternatively, the wide-angle camera is used in a special mode to capture the background while the operator ensures that no foreground objects or people are in the scene.

In yet another mobile camera images are used to "repaint" the panoramic scene (background image 300). As a camera image is moved over the scene, it would leave behind its most recent view of that scene area.

Figure 4A:
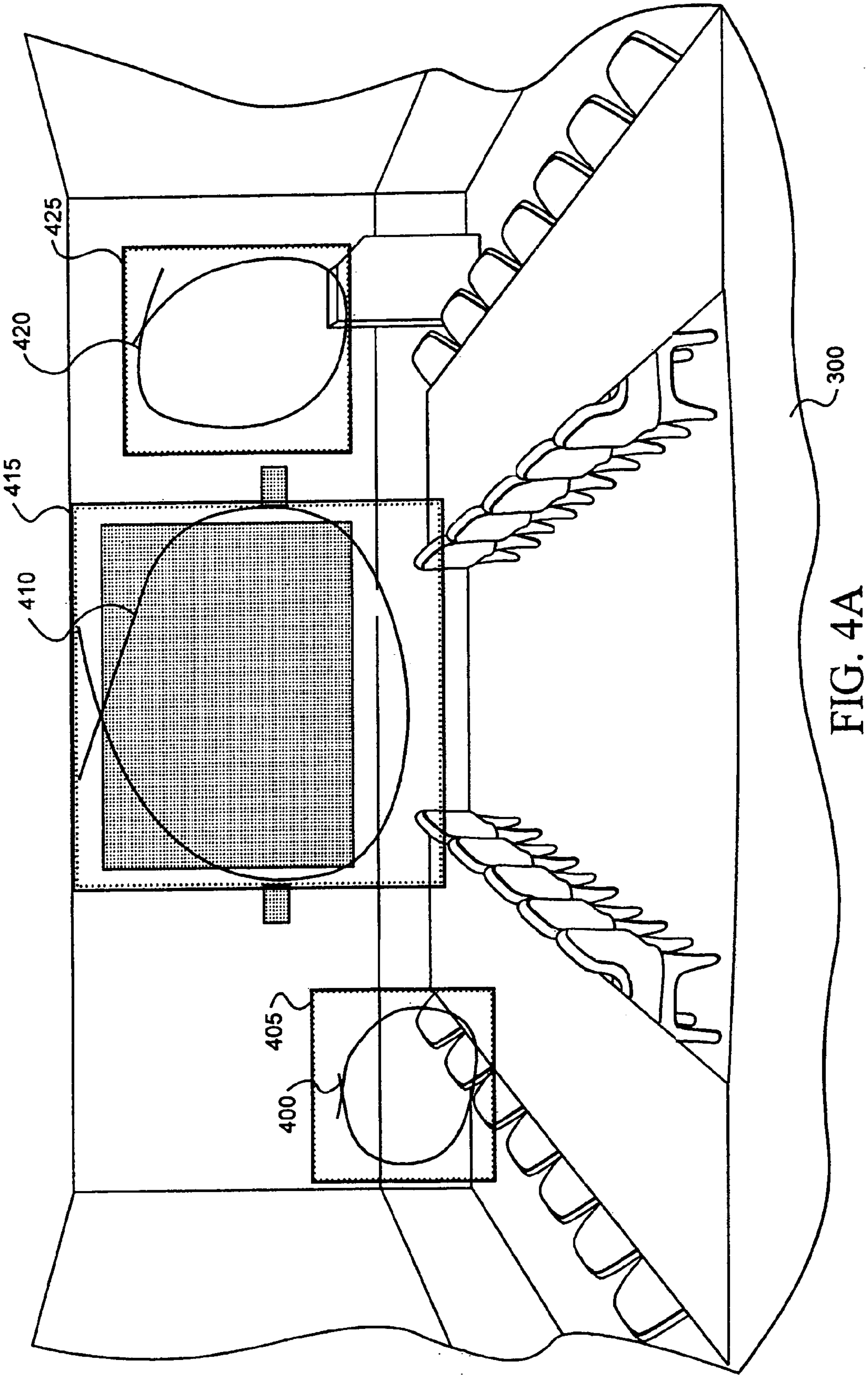
FIG. 4A is an example of a pen based user interface for directing camera views.

FIG. 4A shows an alternative interface suitable for a pen-based device. Here, the user circles a desired camera location on the background image 300 with a scribbling motion (e.g., scribbling motions 400, 410, and 420). The system (camera view control 120, for example) determines the width and height of the scribble and fits a rectangle (e.g., rectangles 405, 415, and 425) with the proper camera aspect ratio (Alternative configurations allow displays with altered aspect ratios, or part screen displays).

Figure 4B:
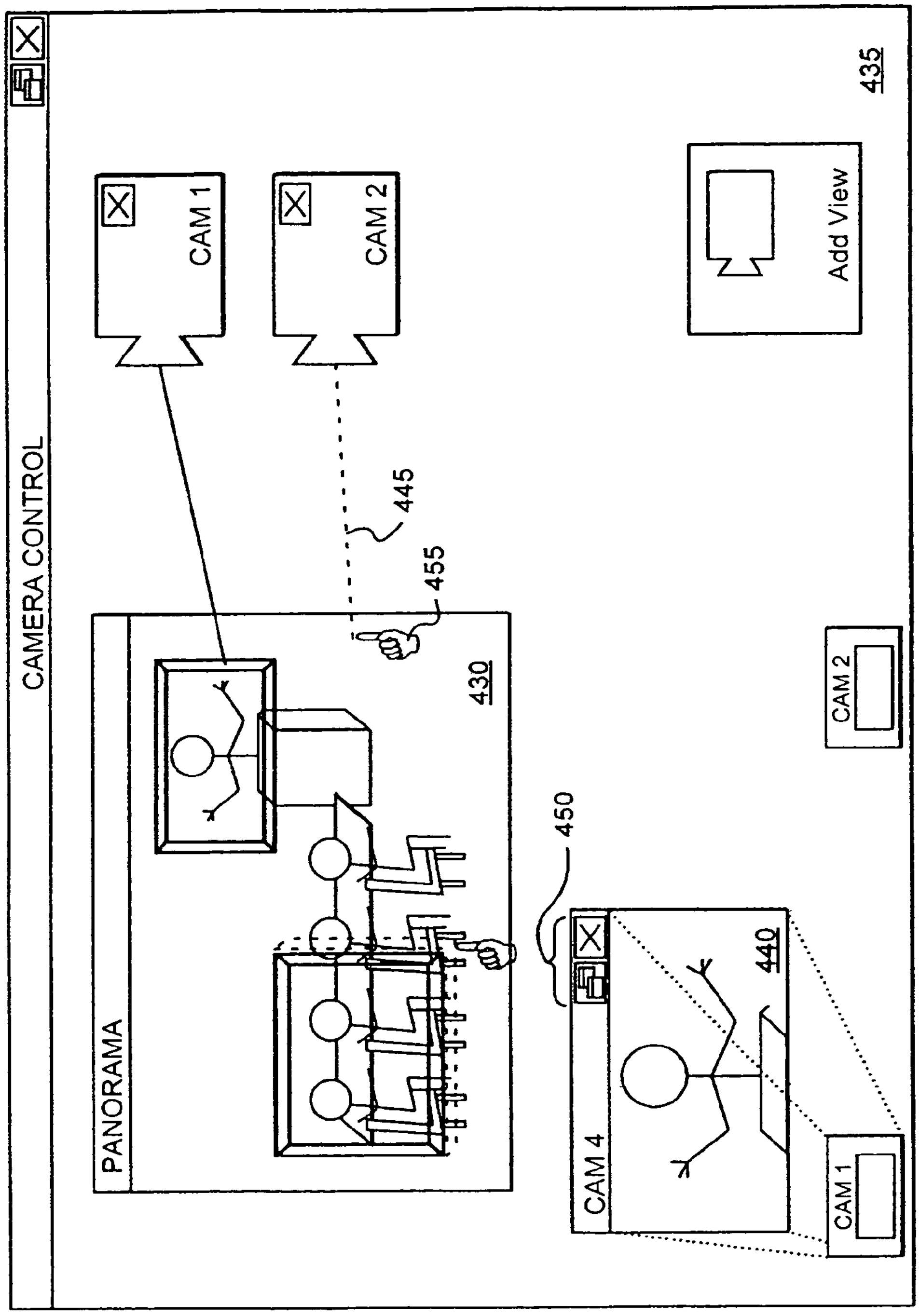
FIG. 4B is an example of graphical selection of camera views from a panoramic view, and assignment of cameras to selected views.

FIG. 4B illustrates an example of a graphical selection of camera views from a panoramic view 430, and assignment of cameras to selected views. A panoramic view (panorama) 430 is displayed by a camera control application 435. A user selects a view from the panorama by pointing and dragging an expandable frame on the desired view location of the panoramic view 430. In the case of a virtual camera, the view is composed from a wide angle shot or composite image of a camera array and displayed on a display device (550, for example, see FIG. 5), and may also be shown on the camera control application 435 as a reference view 440, for reference by the user. Each reference view would include standard dialog icon, expand, and full-size control buttons (e.g., control buttons 450).

In the case of fixed cameras, the camera control application may select an appropriate camera to retrieve the selected view, or the user may assign a camera. In one embodiment, the camera control application would be configured to automatically recognize cameras providing video to the video stream and provide an icon for each. A user would then match a camera with a view by drawing a line (e.g., line 445) between a camera icon and a selected view. Alternatively, cameras could be recognized or added via a separate control function (e.g., add view button 435) or pull down menu, which would provide or query for any addition set-up information needed.

Although FIG. 4B illustrates a pointing device (e.g., hand 455), the illustrated processes may be performed by any user interface, including pen based systems as discussed above. Possible user/device interactions for indicating the processes to be performed (e.g., moving the camera view (pan/tilt/zoom) and changing camera attributes), may be performed in many different manners. For example:

1. To move camera view:
   a. Click or indicate desired region
   b. Draw "rubber band" line from camera icon to desired region
   c. Circle indicated region
   d. Click on relative position control
   e. Click on absolute position control
   f. Grab scene and move "under" camera
   g. Grab camera icon and move to desired position
2. To change zoom attributes:
   a. Draw larger circle, circle direction (cw/ccw), or spiral outwards
   b. Draw smaller circle, circle direction, or spiral inwards
   c. Grab zoom control/scroll bar
   d. Grab and move edge of camera indicator box or handle brackets
3. To change Focus:
   a. "Scribble" to change or auto focus
   b. Grab focus control/scroll bar
4. To change or switch camera:
   a. Gesture "X" to turn off camera
   b. Camera position indicator replaces another camera: switch to new camera
   c. Click on camera icon A paper-based version of pen-based camera control may be realized using a printed image of the panoramic view or scene. Selection of points of interest on the paper may be determined by using paper encoded with Xerox DataGlyphs (i.e., data carpet) (see http://www.seyboldseminars.com/seybold_report/reports/D0905001.HTM, for example). Alternatively, a stylus tablet (e.g., Wacom http://www-.wacom.com) may be used for the pen input. In yet another alternative, a printout of the panoramic view on plain paper may be drawn on and scanned into the camera view control 120.

Figure 5A:
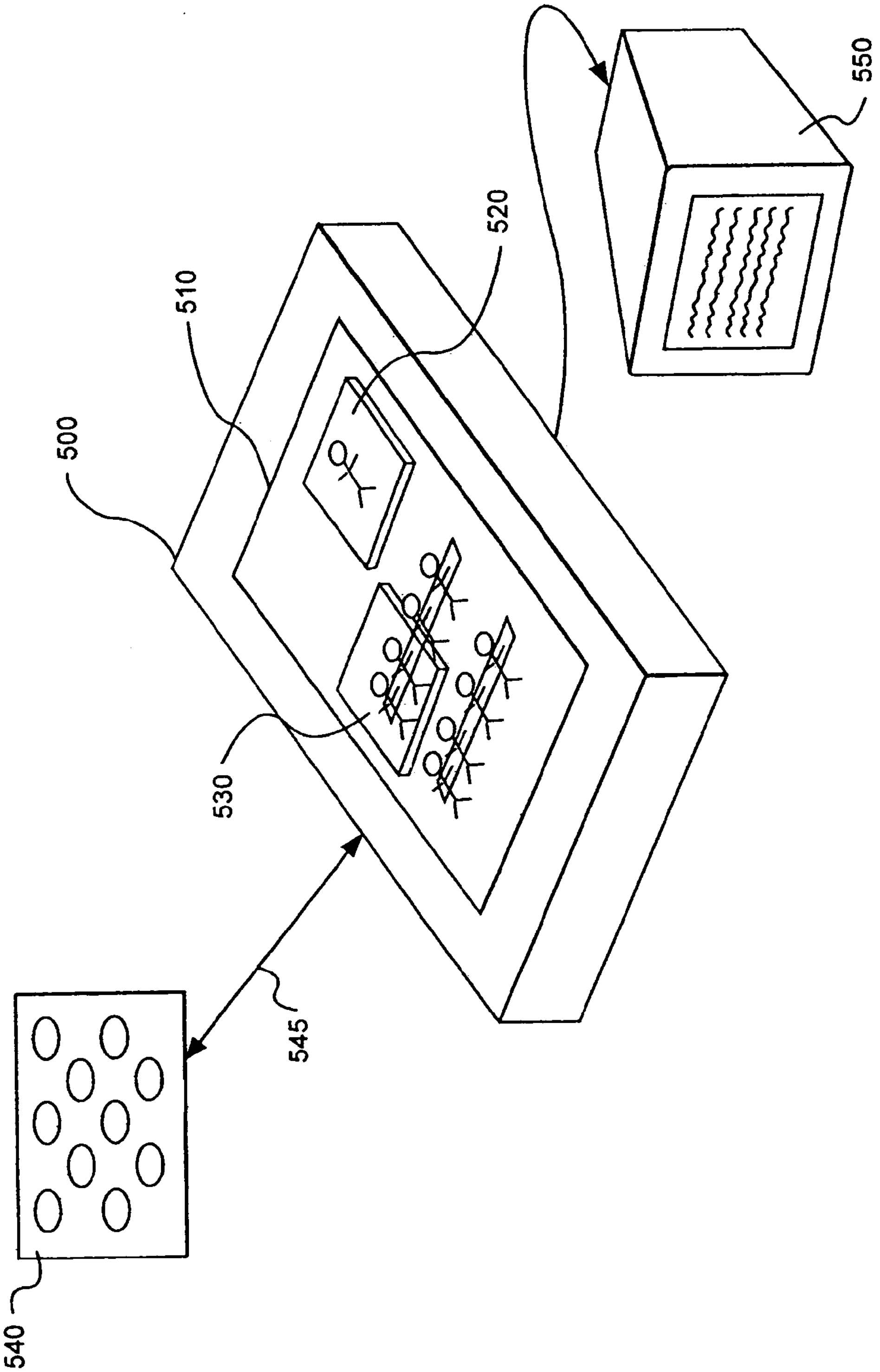
FIG. 5A is a graphical illustration of one embodiment of a view control mechanism utilizing physical tokens and a touch sensitive (tangible) control surface.

Another embodiment of the present invention, including a tangible camera control interface, is illustrated in FIG. 5A. A view control mechanism 500 includes a tangible control surface 510, which displays a panoramic or other representation of a scene viewed by at least one camera 540 (shown as a camera array) according to the present invention.

Physical "window frame" objects 520 and 530 (frame objects, also called tokens) are used to represent camera views. The frame objects 520 and 530 are placed onto the tangible control surface 510 at fields of interest of the scene. The tangible control surface 510 includes a detection mechanism for detecting presence of frame objects (e.g., a touch sensitive display). In one embodiment, a touch sensitive screen determines the size and shape of the token via an area touched on the screen. In another embodiment, a bar code or other identifying marks (e.g., an electronic tag) are read via an input mechanism (e.g. touch sensitivity, scanning, electrical field detection).

In one embodiment, the frame objects are rectangular and are precut to a correct size, allowing a detection of the physical attributes of the frame objects to allow the camera view control 120 to provide corresponding camera control, including detection for clipping the video stream 545 and showing the clipped view on a full screen display at a proper aspect ratio. In another embodiment, the tokens are virtual and re-sizable to maintain a correct aspect ratio.

To activate the control, the user places the frame on the panoramic view of the tangible control surface 510. The panoramic view is clipped and displayed at a user output 550, or provided to a recording device (not shown), or a projection device (not shown). In alternative embodiments, the clipping process may be performed at the view control mechanism 500 and the clipped images sent to user output 550, or the panoramic view and clipping commands are sent to user output 550 where the clipping process is performed before sending the clipped image to the display device.

Picking up a frame object removes the clipped view associated with that frame object. Dragging a frame object pans the view. Multiple frames may be used to quickly select between multiple views by touching the frame of interest. Lastly, the tangibility of the frames offers a unique capability: the user may hold a frame over the display without dropping it to "cue up" a view without invoking the electronic control function.

Figure 5B:
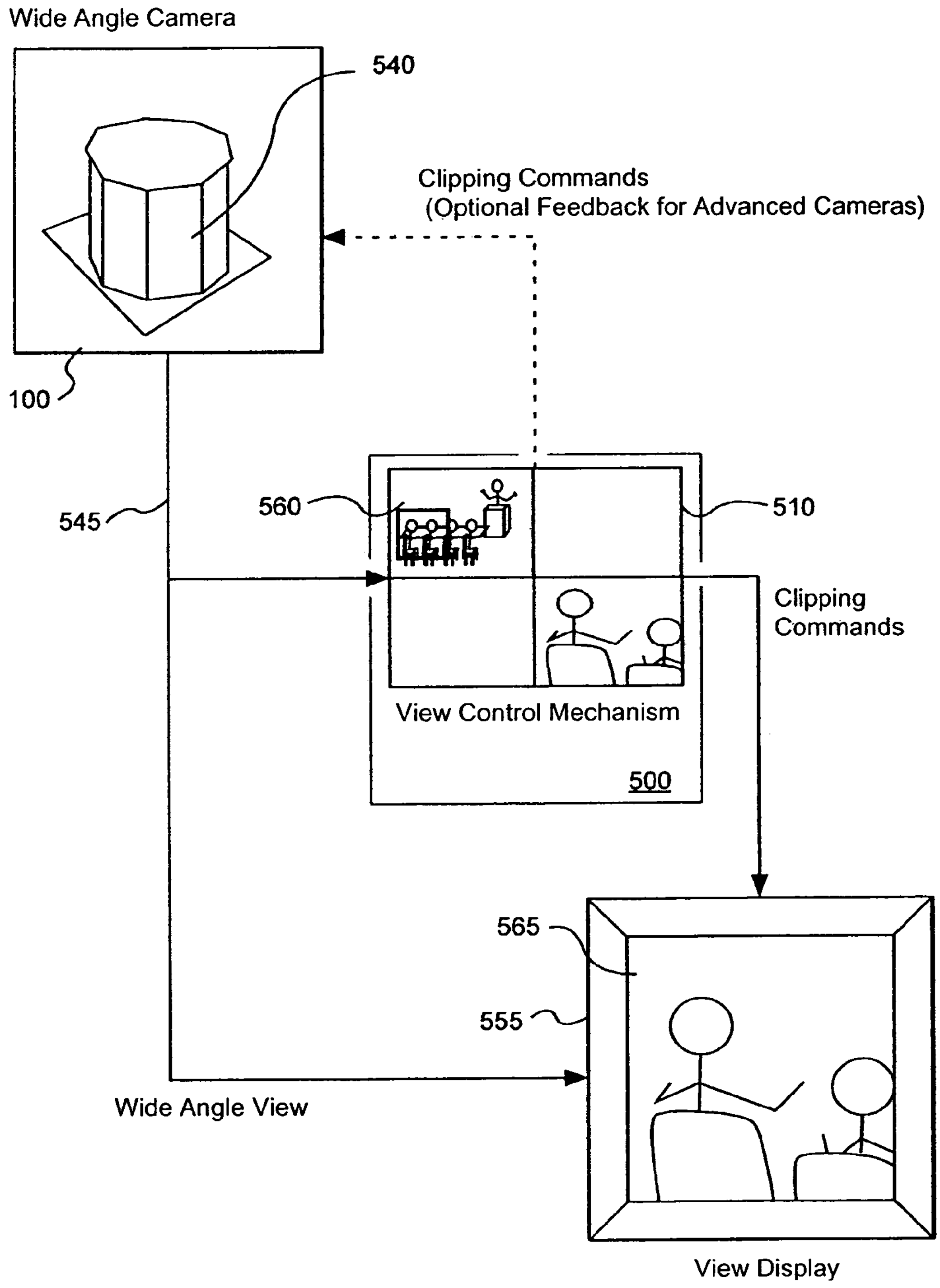
FIG. 5B is an embodiment of a tangible control surface and control tokens.
Figure 5C:
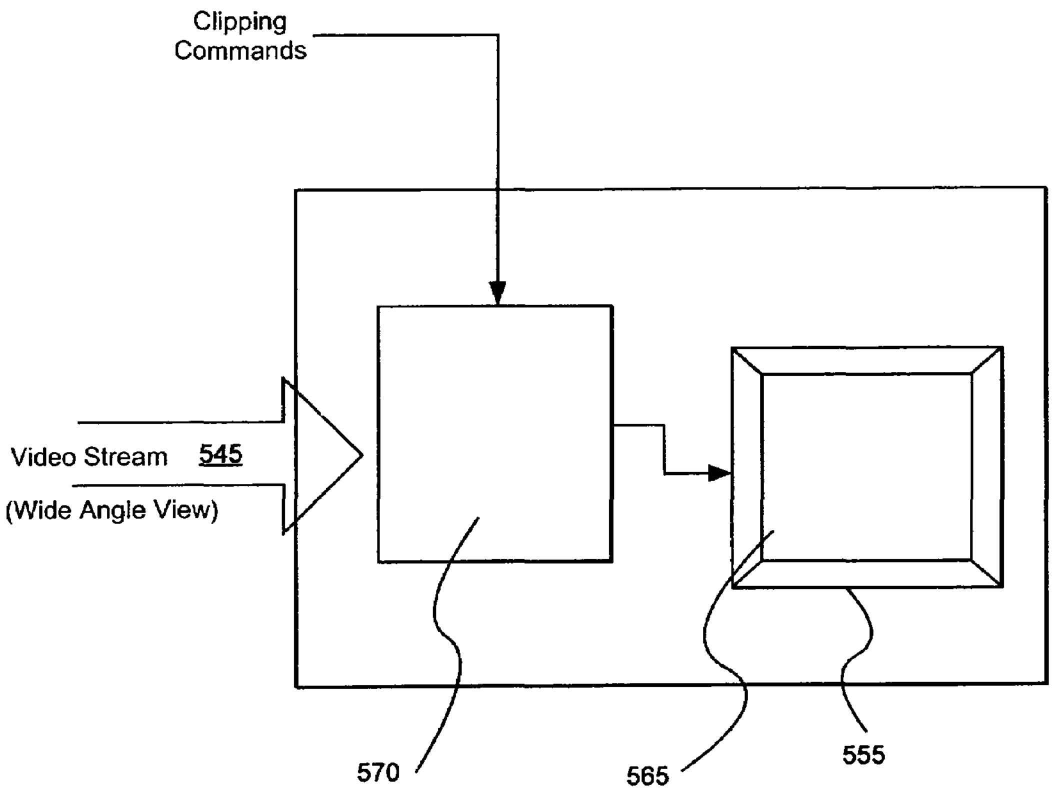
FIG. 5C is a block diagram of a view display apparatus according to one embodiment of the present invention.

In one embodiment, the flow of video data through the tangible interface is shown in FIG. 5B. Frame objects of preset size (560, for example) indicate the clip regions. A camera data stream 545 is split and directed simultaneously to the tangible control surface 510 and a display application 555 (e.g., videoconference image, meeting capture recording, etc.). Each token location is used to determine the clipping region needed for the display view. The clipping commands are sent to a display processor 570 (a part of the display application 555, for example, see FIG. 5C) in order to perform the clipping operation of the wide-angle view needed to produce the clipped or isolated view 565.

The display processor 570 sizes the image to the aspect ratio required of the display application 555. Optionally, the clipping commands may be fed back to the camera for advanced processing (e.g., image processing of areas of interest).

Figure 6A:
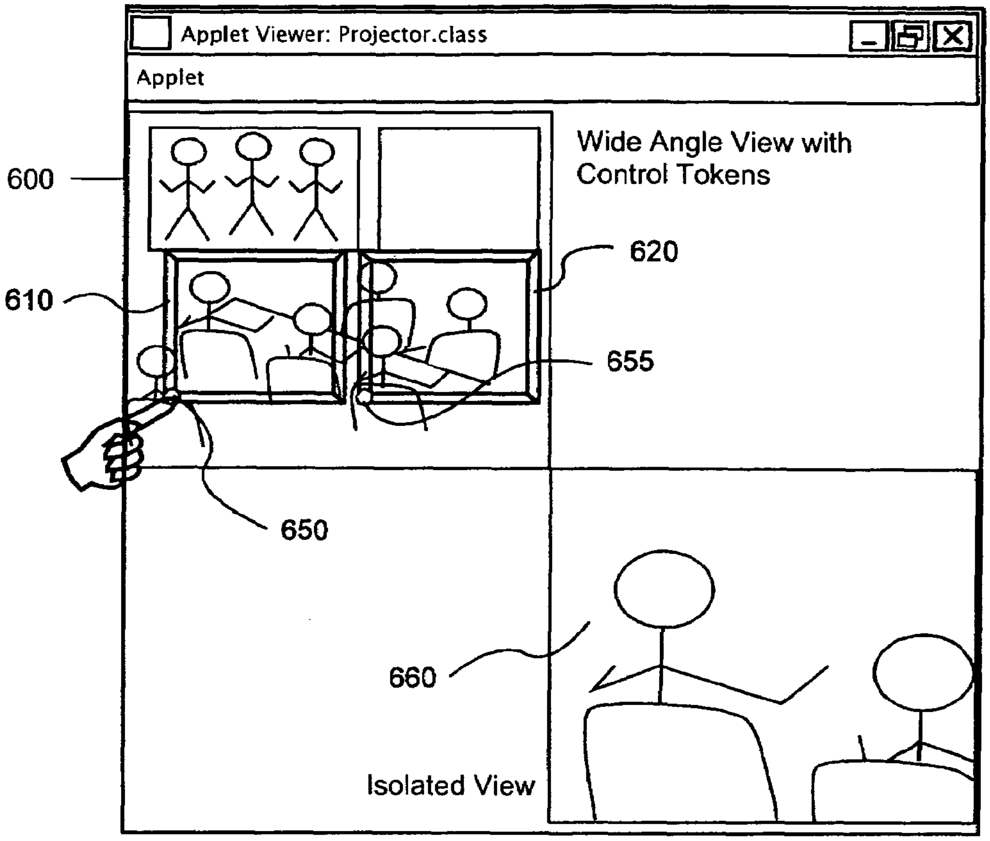
FIG. 6A is a diagram illustrating a spatial user interface for implementing a view control mechanism.

An example enlargement of the tangible control surface 510 is shown in FIG. 6A. The tangible control surface 510 has the following features for supporting wide-angle view clipping:

Physical See-Through Tokens

Physical see-through frame tokens 610 and 620 select clipping regions of a wide-angle view 600. The physical constraints of the frame tokens help simplify the control interaction between the user and the tangible control interface. Again, the user may look through the tokens to see what will be displayed before invoking the clipping action by dropping the token. The material the tokens are constructed from may be of a transparent or light conducting material such that parts of the scene covered by the token material may be viewed without lifting the token.

Preset Token Sizing

Figure 6B:
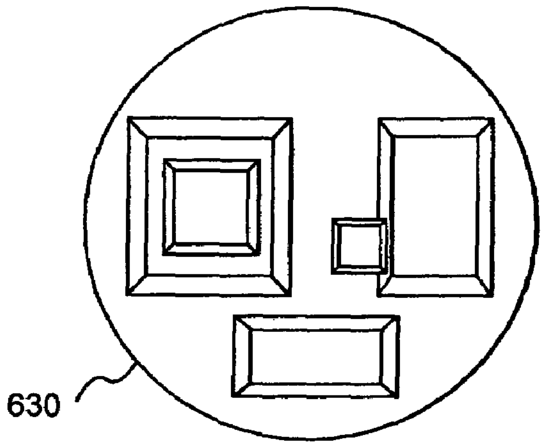
FIG. 6B is an illustration of a set of physical tokens.
Figure 6C:
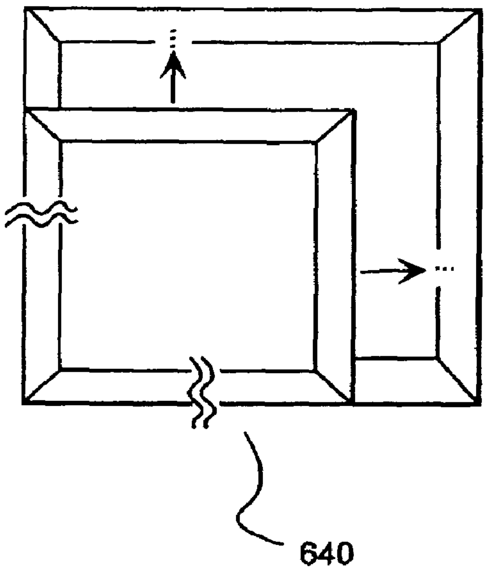
FIG. 6C is an illustration of a re-sizable physical token according to the present invention.

The size of the frame may be preset to the correct aspect ratio needed, freeing the user from having to make such adjustments. If one preset size is not quite right for a particular view, a collection of several larger or smaller tokens (630, FIG. 6B, for example) could be kept handy. However, an expandable/collapsible frame (640, FIG. 6C, for example) capable of changing in size but preserving a correct aspect ratio may also be used. The system could also select the appropriate clipping region that covers the frame token (approximating a size to clip, while automatically preserving the correct aspect ratio of any object placed on the tangible control surface).

In another embodiment, an adjustable frame size is identified by two tokens that mark, for example, an upper left and lower right corner of a frame to be captured. In yet another embodiment, a virtual token may be drawn on the control surface (via Etch-a-Sketch™ type controls, for example), and activated via software controls (automatically, or via buttons, selection boxes, pull down menus, etc).

Tokens may also be pre-defined and preset at a specific location on the control surface. In cases, such as lecture halls or conference rooms, presetting a token, or a frame of the wide angle view to encompass a speakers podium, white board other visual aids would allow for fast switching between the preset views. The views may be activated by touching an area of the control surface (510, for example), or via software controls (automatically activated based on motion, for example, or via operator controls such as buttons or pull-down menus). The tokens themselves may be preset on the control surface, virtually drawn on the control surface, or need not even be present (perhaps shown on a startup display of the control surface, or temporarily displayed if requested by an operator).

Token Activation

Tokens may be active or inactive (e.g., cued for next display). For example a button indicator (650 and 655, for example) may be affixed to a token or a gesture sequence with the frame (e.g., small side-to-side motion) may be recognized by a location underlying the token.

Token Placement

Active and inactive viewing regions may be moved as needed. Dragging a token pans the view. Picking up and dropping a token swaps views. An active/inactive indication may be used to keep a spurious view of the wide-angle camera shot from intervening during this kind of camera switching.

For example, a user can pick up, drop, and activate a token to 'change' views. In addition, a user might use two tokens and swap between views by alternately activating one or the other.

The isolated view display 660 shows the active region selected by the tokens by performing a clipping operation on the wide field view 600. Communication of the clipping data may be performed by a network communication (e.g., remote procedure call, socket communication, remote method invocation) or any interprocess communication mechanism (e.g., shared data, code segments, etc.) for programs running on the same computer.

Sensing the tangible control token involves detecting the token identity, the token location in the tangible control surface reference frame, and detecting the active/inactive frame state. The detection of identity, location, and event may be performed as provided by Nelson et al., U.S. Pat. No. 6,195,093, entitled "Systems and Method for Controlling a Presentation Using Physical Objects," issued Feb. 27, 2001, which is incorporated herein by reference, in its entirety.

Figure 7:
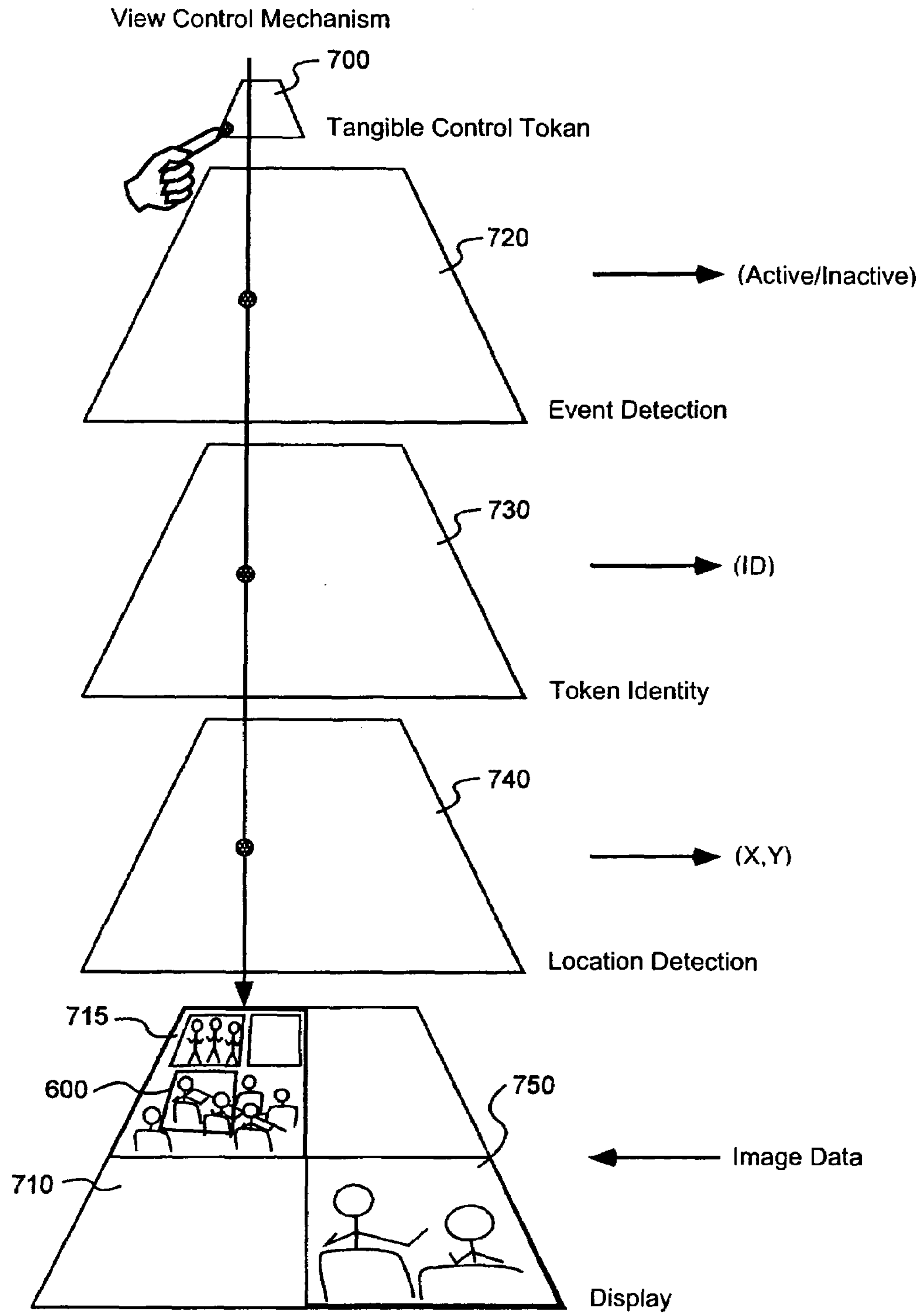
FIG. 7 is an illustration of steps for identifying and producing a view based on view control mechanism and a tangible token.

Described with reference to FIG. 7, a tangible control token 700 is placed on a tangible control surface 710 displaying a wide angle view 600 at location 715. The touch sensitive screen detects 720 the presence of the token 700 and determines whether or not the token is active (detecting additional pressure, or a sequence of events, taps, for example). The token is identified 730 based on a pattern or other communication mechanism between the token and touch sensitive screen. And finally, a location of the token is determined 740, which includes any one of a center position (x,y), a position and a radius or other geometric properties (length and width, for example). Each of the position determined, ID of the token, and whether the token is active or inactive is provided to a command device (730, for example) which determines clipping commands to produce a display 750.

Camera Control by Target Illumination or Virtual Illumination

As described briefly above, the present invention includes capturing and interpretation of physical gestures to control cameras configured according to the present invention. The physical gestures indicate an actual area (area of interest) to be filmed.

Figure 8A:
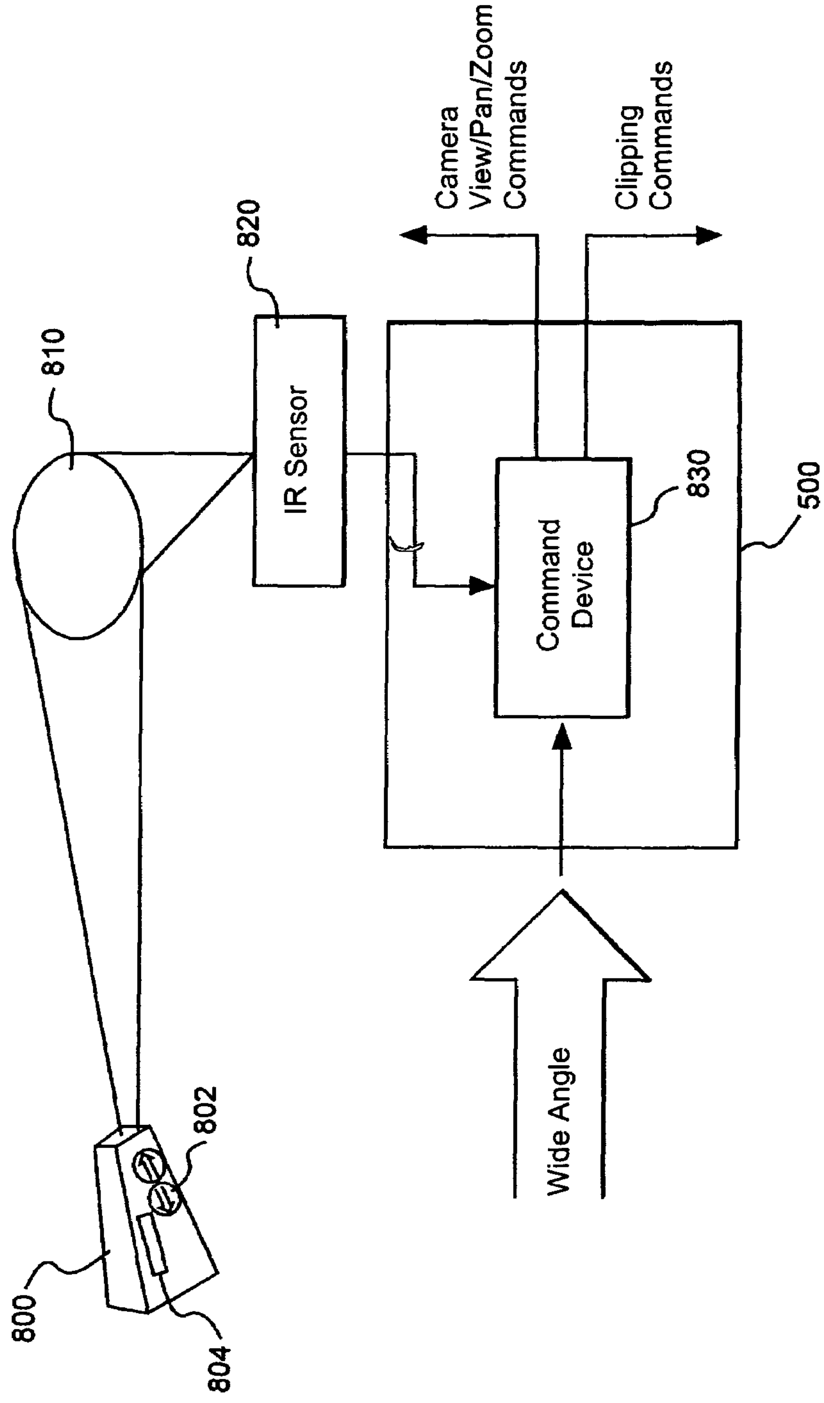
FIG. 8A is block diagram of one embodiment of a view control mechanism having a sensing device for recognizing illumination areas for directing camera operations.

In one embodiment, as shown in FIG. 8A, a user uses a handheld illumination source, such as an infrared semiconductor laser 800. The user indicates a desired area 810 by pointing at the desired area 810 and illuminating it with the illumination source 800. An IR-sensitive sensor 820 (such as a CCD camera) determines a position of the illuminated area, and a command control device 830 translates the location into clipping control parameters (clipping commands), so that the illuminated area is clipped from the wide-angle view. The user can either scribble the illuminated area with a beam from the laser, or, alternatively, a predetermined geometric shape projected by the laser and adjusted in size by a sizing selection mechanism (e.g., up-down buttons 802 or a roller knob 804).

Figure 8B:
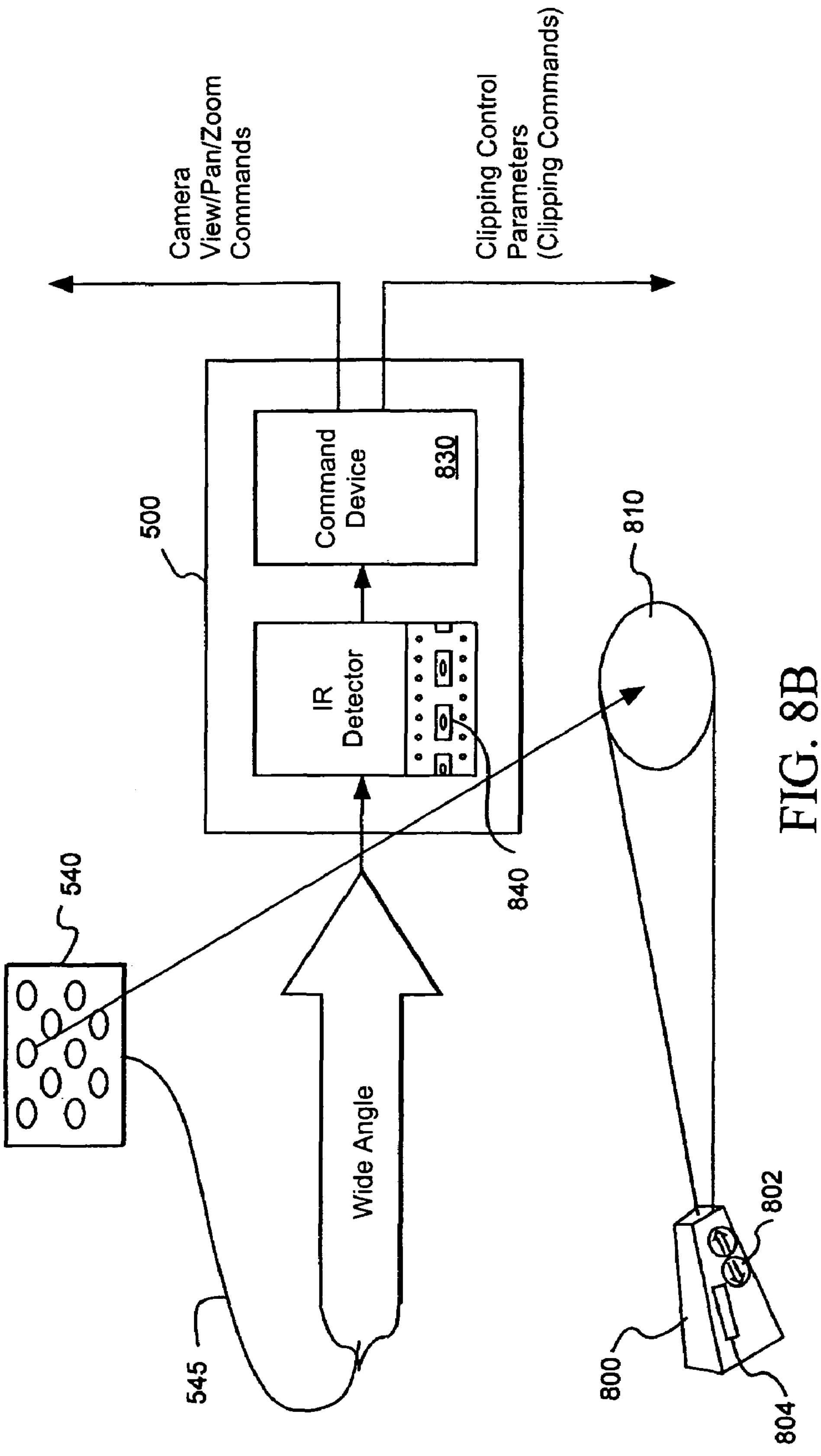
FIG. 8B is a block diagram of one embodiment of a view control mechanism having a detector for detecting illuminations in frames captured by a camera to be controlled by said illuminations.

In another embodiment (see FIG. 8B), the camera 540 detects the laser image projected by the laser 800, the detection being included in the video stream 545 and sent to view control mechanism 500. An IR detector 840 detects the laser image in the video stream, which signals the command device 830 to set clipping control parameters (clipping commands) and other camera controls when applicable (such as, for example, the case of camera controls being fed back to the camera 100, as discussed above, e.g. panning and zooming).

In yet another embodiment, a handheld directional device is used to indicate the desired area. Sensors on the device that can determine spatial position and orientation (for example, the Polhemus FastTrak [http://www.polhemus-.com]) can be used to specify a desired location or area by pointing at it. Given absolute position and an orientation vector, the system can determine the area pointed at by finding the intersection of the orientation vector with a known distance curve, for example, a room wall or conference table edge. If range can be determined, for example using an ultrasonic rangefinder (e.g., Polaroid sonar range finder [www.polaroid.com]), the 3D coordinates can be determined precisely and translated into clipping control parameters.

Figure 9:
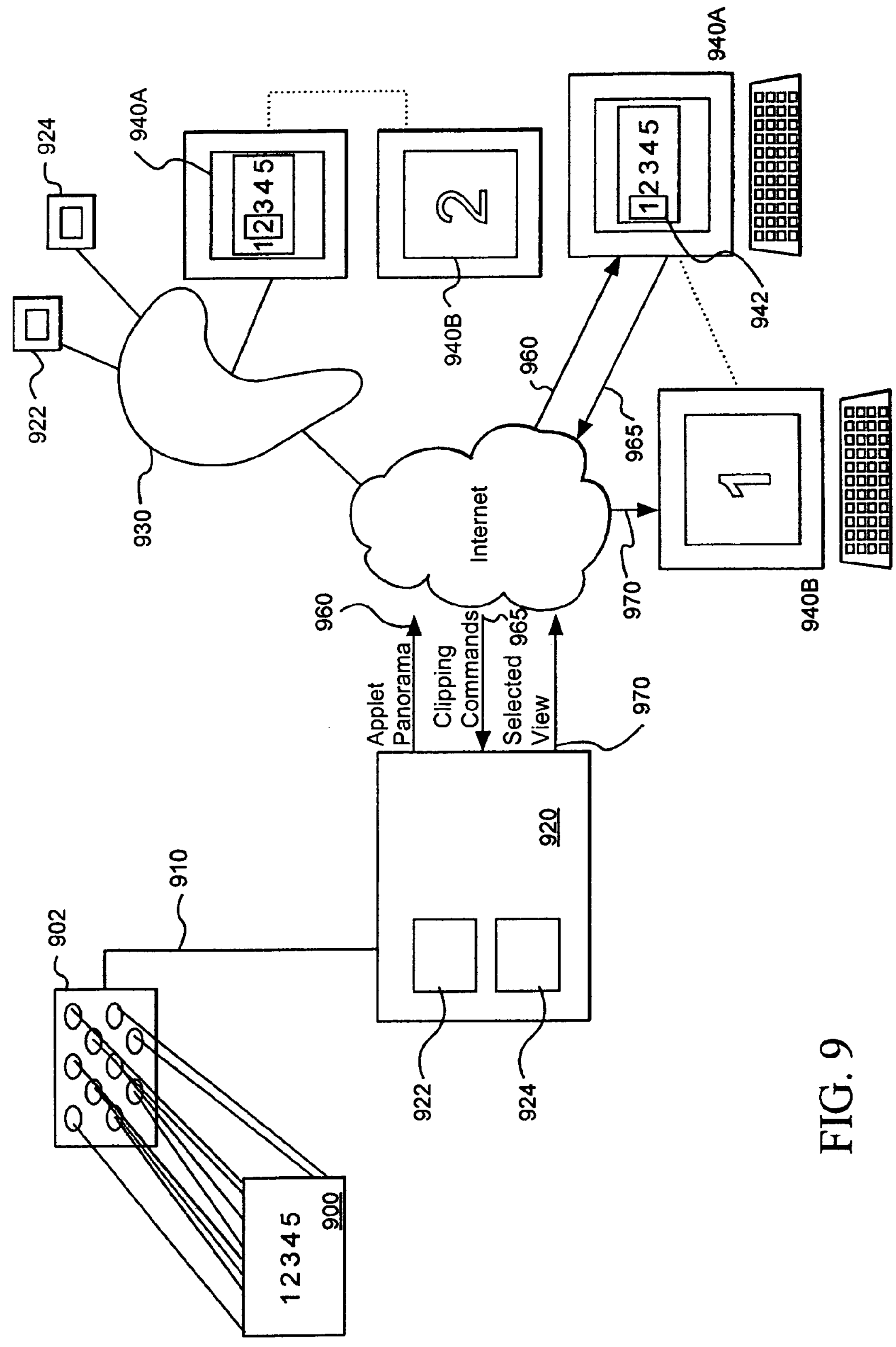
FIG. 9 is an example of an Internet based embodiment of the present invention.

FIG. 9 illustrates an Internet based embodiment of the present invention. A camera array 902 produces a video stream 910 that is fed into a server 920. The server 920 broadcasts (in response to a query) a panorama of scene 900 retrieved from the video stream 910, and an applet 960 or other program for presenting and selecting views from the panorama to a requesting computer, 940A for example (alternatively, the applet or other program may already be resident on the requesting computer).

The requesting computer 940A then displays the panorama and provides at least one drag and drop icon 942 for scene selection. The applet recognizes the location and size of the drag and drop icon 942 and sends clipping commands 965 identifying a requested view over the Internet to server 920. The server 920 utilizes the clipping commands to produce an image (high resolution, super-resolution, or stereo image, for example) that is then sent back to the original requesting computer 940A, now shown as 940B with an image of the requested view.

In one embodiment, the server 920 utilizes a composition mechanism 922 to compose the panorama from plural camera views of camera array 902, and a clipping mechanism 924 clips the selected view from the video stream or a super-resolution composite of the images present in the video stream. The invention may be practiced across a normal modem connection via an Internet Service Provider, a cable modem, DSL, ISDN, T1, T3, or any other type of Internet connection in a stand alone mode or in conjunction with another network (e.g., a satellite network, or Ethernet 930).

A specific configuration for a remote based application of the present invention would be selected based on the availability of broadcast bandwidth and processing power available at each of the server 970, connected network (Internet in the above example, but could be embodied in any local area, wide-area, satellite or other network type). As will be appreciated by those skilled in the art, any number of combinations or modifications of the Internet based embodiment and the mechanisms implementing it may be realized, consistent with the invention as described herein.

Many of the embodiments of the present invention as described herein are described with reference to video or filming operations, however, as will be appreciated by those skilled in the art, the same processes and procedures apply to both video and still image captures.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identification of gestures, laser emissions, pen drawn shapes, identification of touch or pressure sensitive signals, building and/or formatting of commands to control a clipping process or control functions of a camera or camera array, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of controlling one or more cameras, the method comprising:

using an interface including a representation of a scene and information embedded within the representation such that the information is recognized as a portion of the scene;

associating an object with the interface;

reading the information from the interface with the object;

determining a location within the scene with said information;

directing a view of at least one of said one or more cameras toward said location within the scene; and displaying said view.

2. The method of claim 1, wherein said information is digital information embedded within the representation.

3. The method of claim 2, wherein said representation is a photograph.

4. The method of claim 2, wherein said representation is a drawing.

5. The method of claim 2, wherein said interface is paper.

6. The method according to claim 2, wherein the representation is a graphical representation.

7. The method according to claim 2, wherein the representation is an architectural drawing.

8. The method according to claim 2, wherein the representation is a schematic.

9. The method according to claim 2, wherein directing a view comprises retrieving at least one virtual view, from at least one of said one or more cameras, corresponding to said location.

10. The method according to claim 2, wherein the representation comprises an image formed from a plurality of video images from said one or more cameras.

11. The method according to claim 2, wherein:

said one or more cameras is a camera array; and said object corresponds to a virtual view of said camera array.

12. A method of controlling one or more cameras, the method comprising:

using a representation of a scene;

wherein the representation includes indicia integrally formed with the representation, the indicia adapted to communicate location information;

associating an object with the representation;

detecting one or more of the indicia from the representation with the object;

determining a location within the scene from the one or more indicia; and directing a view of at least one of said one or more cameras toward the location.

13. The method of claim 12, wherein said indicia is digital information embedded within the representation.

14. The method of claim 12, wherein said representation is one or more of a photograph, a drawing, a graphical representation, an architectural drawing, and a schematic.

* * * * *